United States Patent [19]
Kwoka

[11] Patent Number: 5,060,775
[45] Date of Patent: Oct. 29, 1991

[54] FLUID FRICTION COUPLING

[75] Inventor: Georg Kwoka, Siegburg, Fed. Rep. of Germany

[73] Assignee: Viscodrive GmbH, Lohmar, Fed. Rep. of Germany

[21] Appl. No.: 593,674

[22] Filed: Oct. 5, 1990

[30] Foreign Application Priority Data

Oct. 13, 1989 [DE] Fed. Rep. of Germany ....... 3934327

[51] Int. Cl.$^5$ ............................................. F16D 31/00
[52] U.S. Cl. ...................................... 192/58 B; 74/650
[58] Field of Search ...................... 192/49, 58 A, 58 B; 74/650

[56] References Cited

U.S. PATENT DOCUMENTS

| | | | |
|---|---|---|---|
| 1,192,233 | 7/1916 | Severy | 192/58 B |
| 1,854,952 | 4/1932 | Nilson | 192/58 B |
| 3,025,686 | 3/1962 | Lewis | 192/58 B |
| 3,648,811 | 3/1972 | La Flame | 192/58 B |
| 3,948,048 | 4/1976 | Lifka | 192/58 A |
| 4,886,152 | 12/1989 | Teraoka | 192/58 B |

FOREIGN PATENT DOCUMENTS

| | | | |
|---|---|---|---|
| 3828421 | 3/1989 | Fed. Rep. of Germany . | |
| 3828422 | 4/1989 | Fed. Rep. of Germany . | |
| 74036 | 4/1948 | Norway | 192/58 A |
| 2220465 | 1/1990 | United Kingdom . | |
| 2222232 | 2/1990 | United Kingdom . | |

Primary Examiner—Allan D. Herrmann
Assistant Examiner—Nicholas Whitelaw
Attorney, Agent, or Firm—Toren, McGeady & Associates

[57] ABSTRACT

The coupling has a hub (2) rotatable in a housing (3) at least partially filled with viscous fluid. Two sets of plates (7, 10) are non-rotatably attached to the hub and the housing and alternate in the housing in an overlapping relationship. One set of plates (7) of the coupling (1) comprises segments (14) which are uniformly inclined in one direction and which contact corresponding plates (10) of the other set.

7 Claims, 4 Drawing Sheets

FLUID FRICTION COUPLING

BACKGROUND TO THE INVENTION

1. Field of the Invention

This invention relates to a fluid friction coupling having at least two sets of plates, the coupling comprising a first coupling part in the form of a hub and a second coupling part in the form of a housing which is at least partially filled with a viscous fluid, one of the sets of plates being non-rotatably connected to the first coupling part and the other set of plates being non-rotatably connected to the second coupling part, the plates of the two sets of plates being arranged to alternate and to radially overlap one another.

2. Description of Prior Art

There are prior art fluid friction couplings operating with slotted plates which are provided with scraping edges at the slot rims in the form of thickened portions (see West German Patent Specification No. 36 32 283). These improve the transition from the normal operating mode of the coupling to the hump mode. The term "hump mode" is known to those skilled in the art and is used to describe the condition where the plates are in frictional contact with each other. The scraping edge of the slot rims ensures that the fluid film is scraped off the plane face of the other plate in accordance with the operating principle of a windscreen wiper. However, the removed particles resulting from the friction contact cause a ball bearing effect which reduces the torque transmitting capacity.

SUMMARY OF THE INVENTION

It is therefore the object of the present invention to provide a fluid friction coupling which features a faster transition into the hump mode and to increase the torque transmissible in the hump mode.

The invention provides a fluid friction coupling having at least two sets of plates, the coupling comprising a first coupling part in the form of a hub and a second coupling part in the form of a housing which is at least partially filled with a viscous fluid, one of the sets of plates being non-rotatably connected to the first coupling part and the other set of plates being non-rotatably connected to the second coupling part, the plates of the two sets of plates being arranged to alternate and to radially overlap one another, wherein plates of one of the sets of plates are provided with slots and segments between the slots are inclined in the same direction relative to the radial plane of the plate at an angle which is substantially the same for each segment of the plate.

Because of the flow dynamics of the force component applied, the inclined position of the segments achieves an increased contact pressure on the corresponding plates and an accelerated transition into the hump mode, with the contact pressure being a function of the rotational speed, i.e. it increases with an increasing rotational speed. At the same time, because of the line contact of the projecting edges of the segments, local over-heating of the viscous fluid during rotation is avoided.

In a first embodiment of the invention, the plates with the inclined segments are arranged in an axial sequence with their segments all inclined in the same direction. The unidirectionally arranged plates achieve a higher contact pressure on the adjoining plates of the other set of plates and a pumping effect on the viscous fluid in an axial direction.

In a further embodiment of the invention, the plates with the inclined segments are arranged in an axial sequence in pairs having their segments inclined in opposite directions.

As a result of this design, in case plates with segments inclined in opposite directions contact a corresponding plate of the other set of plates and, due to uniform lateral contact pressure forces, prevent the plates from being bent.

As a result, it is possible to achieve an increase in the contact pressure on the plates of the other set of plates. Although only every second plate of the other set of plates is influenced in this way, the overall torque transmitting conditions are improved.

In a further embodiment of the invention, the plates with the inclined segments are arranged in an axial sequence with the segments of some of the plates inclined in one direction and the segments of the remaining plates inclined in the opposite direction. The plates with their segments inclined in said one direction may be arranged in one half of the housing and the plates with their segments inclined in said opposite direction may be arranged in the other half of the housing. It is possible by this design to achieve an alternative fluid friction coupling design with an increased contact pressure without any pumping effect.

The plates with inclined segments may optionally be associated either with the coupling hub or the coupling housing.

BRIEF DESCRIPTION OF DRAWINGS

Two preferred embodiments of the fluid friction coupling are illustrated in the following drawings in which.

DESCRIPTION OF PREFERRED EMBODIMENTS

Figure 1:
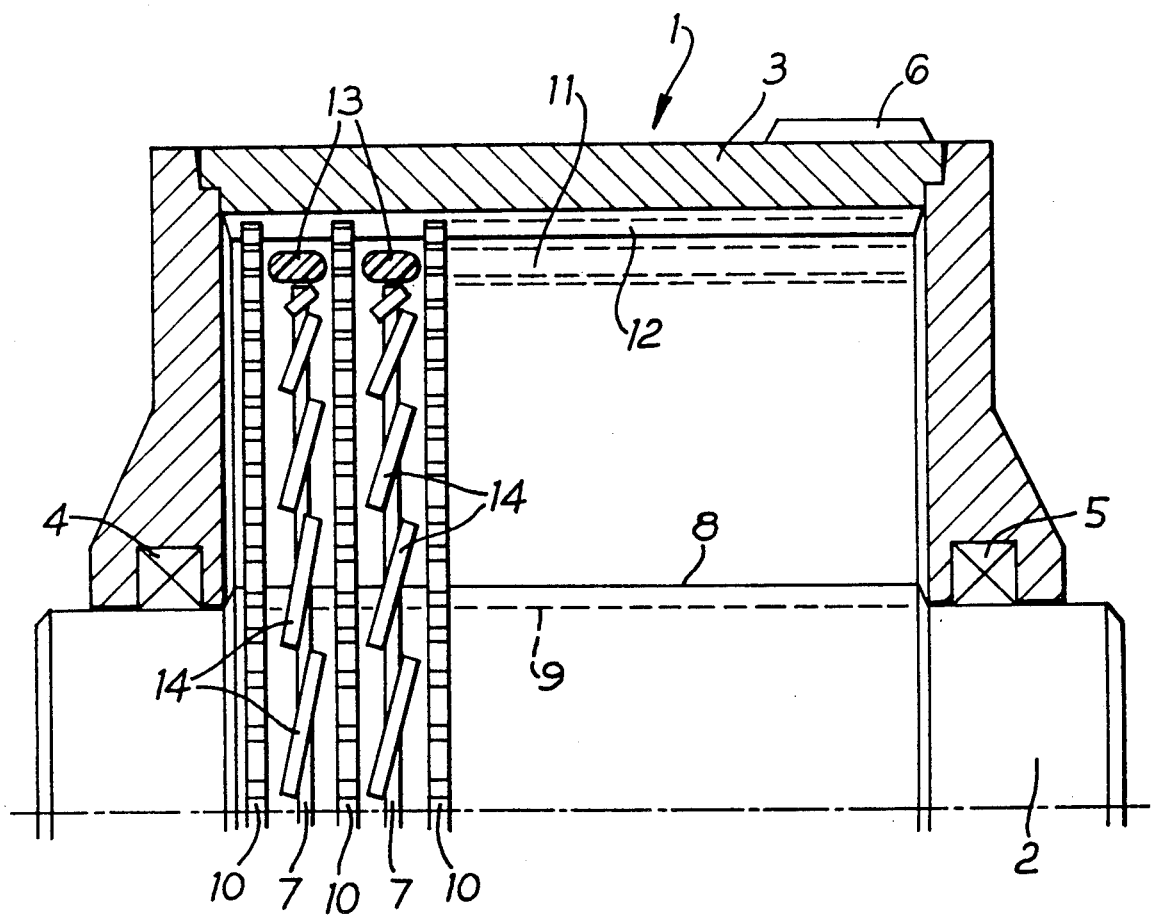
FIG. 1 is a cross-sectional view taken through a fluid friction coupling having plates with segments inclined all in the same direction.
Figure 2:
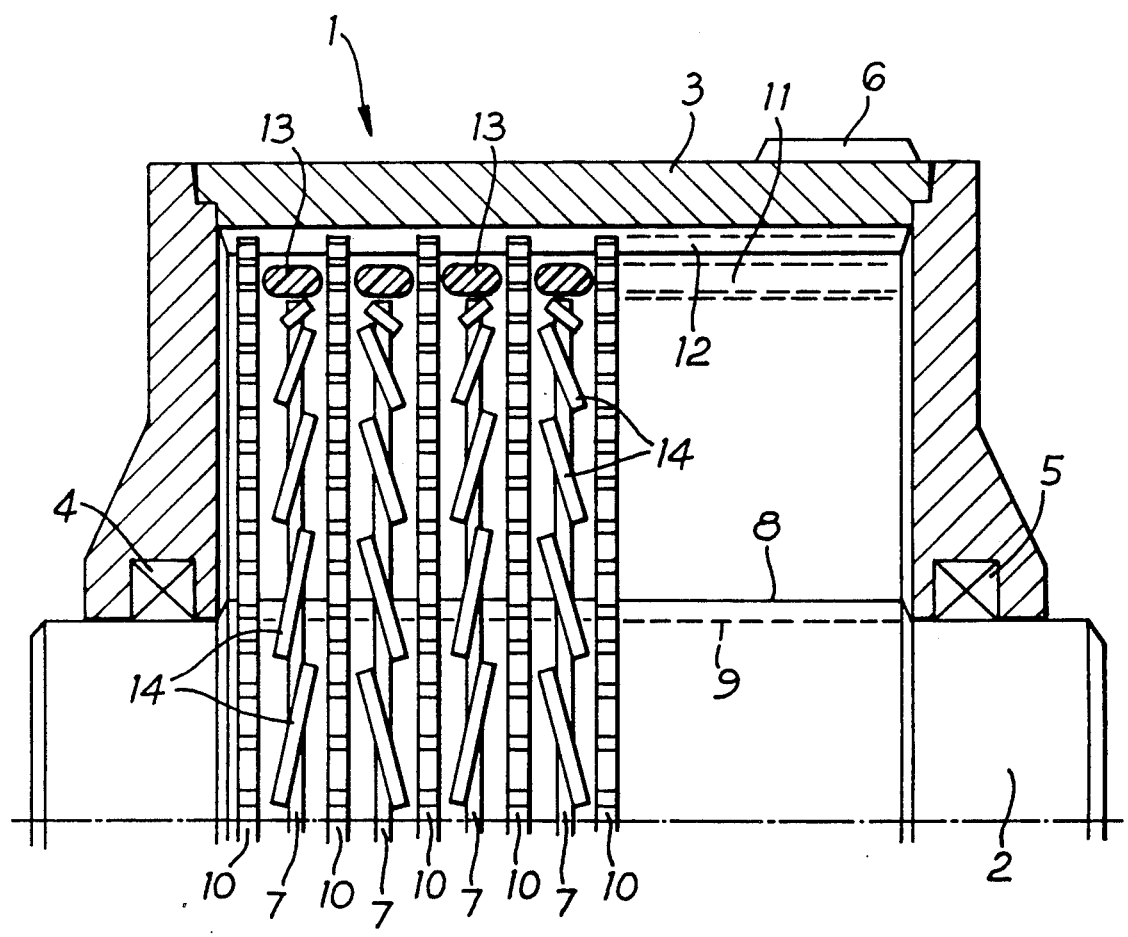
FIG. 2 is a cross-sectional view taken through a further embodiment of a fluid friction coupling having plates with segments inclined in opposite directions.

FIGS. 1 and 2 show fluid friction couplings 1 having a first coupling part in the form of a coupling hub 2 which is supported for rotation within a second coupling part in the form of a housing 3. The hub 2 is supported by two friction bearings and is connected to the driveshaft through a multi-spline profile. The interior of the coupling housing is sealed by two seals 4, 5 and is at least partially filled with a viscous fluid (not shown). The coupling housing 3 comprises external teeth 6 through which the drive is effective.

The coupling 1 has at least two sets of plates, an inner set 7 and an outer set 10. One of the sets of plates is non-rotatably connected to the first coupling part and the other set of plates is non-rotatably connected to the second coupling part. The plates 7, 10 of the coupling are arranged to alternate in the space around the hub 2 in the housing 3 and are arranged to radially overlap one another. The coupling hub 2, in this case, is associated with inner plates 7 which are axially movable to a limited extent. The inner plates 7, by means of inner teeth 8, are non-rotatingly connected to the corresponding teeth 9 of the coupling hub 2. The outer plates 10, by means of outer teeth 11, are non-rotatingly connected to the corresponding teeth 12 of the coupling housing 3 and are spaced by spacing rings 13. The outer plates 10 are designed so as to be planar and slotted. Each of the inner plates 7 are provided with slots 16 (FIG. 3) and the segments 14 between the slots are all inclined in the same direction to the radial plane of the plate 7 at an angle which is substantially the same for each segment of the plate. Specifically, each segment 14 is twisted relative to the plane of the plate 7 so that the segment projects equally on both sides of the plate (see FIGS. 1 and 2). The inner plates 7 uniformly contact the adjoining outer plates 10 of the coupling housing 2, and as compared to conventional viscous couplings, the hump behaviour is improved due to the self-cleaning effect and the axial force component acting on the plates.

In FIG. 2, the inner plates 7 of the coupling hub 2 are axially arranged in pairs with the segments 14 of each pair inclined in opposite directions. Because the inner plates 7, on both sides, contact the outer plates 10, it is possible to achieve a higher contact pressure, thereby avoiding bending of the outer plates 10. At the same time, this design ensures that the viscous fluid is distributed uniformly.

Figure 3:
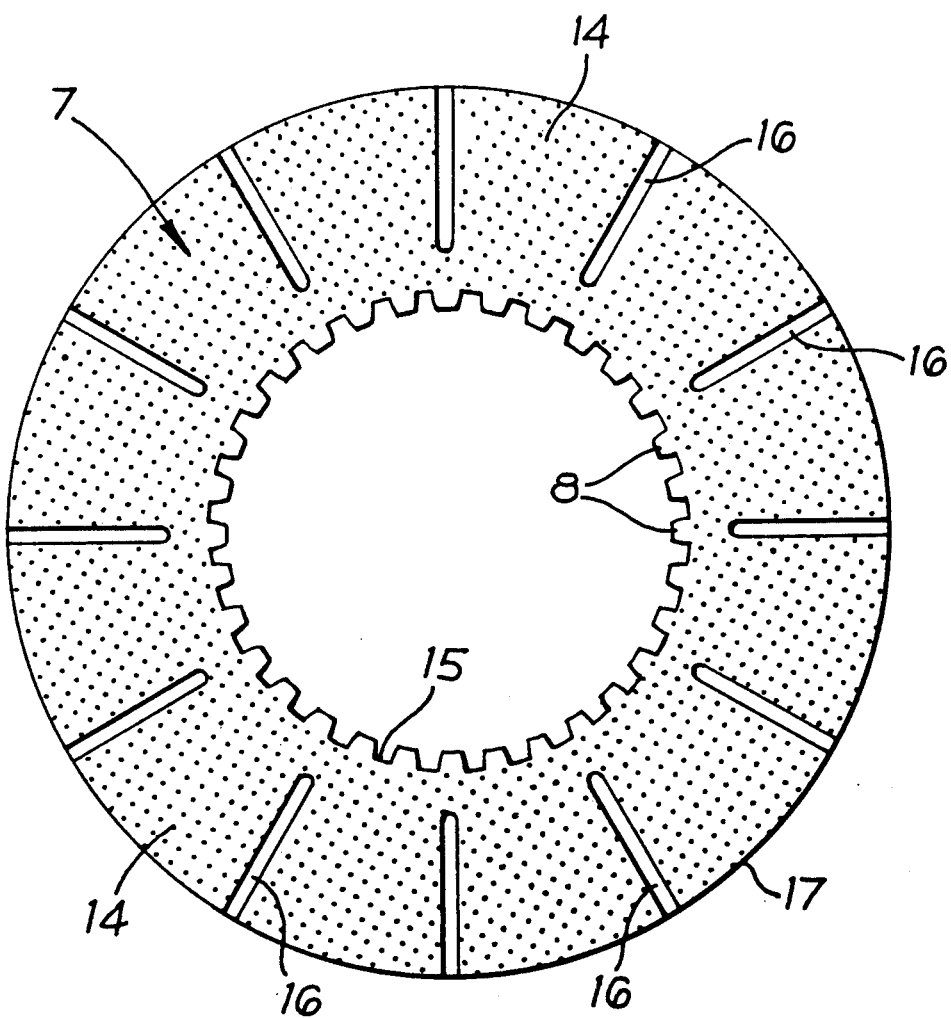
FIG. 3 is a plan view of an individual plate of the fluid friction coupling used in the couplings shown in FIGS. 1 and 2.

FIG. 3 shows an inner plate 7 comprising a central bore 15. The bore 15 is provided with inner teeth 8 by means of which it is non-rotatingly but axially movably accommodated in the teeth 9 of the coupling hub 2. It can be seen that there are provided circumferentially distributed radially extending slots 16 which are open towards the circumferential edge 17. As can be seen in FIGS. 1 and 2, the segments 14 of a plate 7 are all inclined in the same direction relative to the radial plane.

Figure 4:
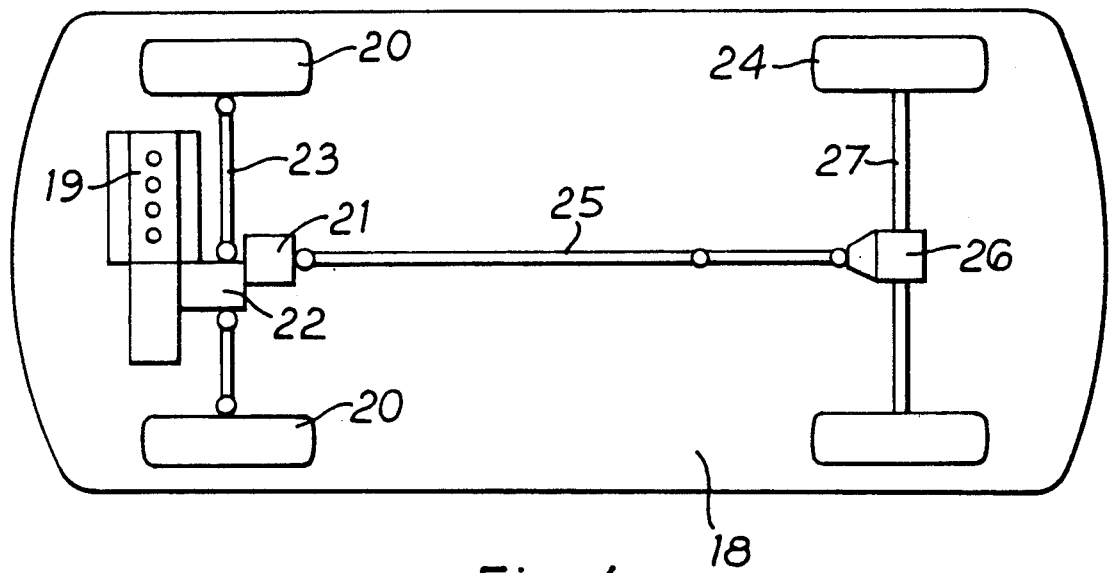
FIG. 4 is a diagrammatic view of a drive concept for a four wheel drive vehicle in which the couplings of FIGS. 1 and 2 can be utilised.

A drive concept for a four wheel drive vehicle is shown in FIG. 4. It is a vehicle 18 with a transversely fitted engine-gearbox unit 19. The front wheels 20 are driven via a central differential 21, a front axle differential 22 and front side shafts 23. The drive for the rear wheels 24 is branched off the central differential 21 via the propeller shaft 25, the rear axle differential 26 and rear side shafts 27. One or more of the illustrated differentials 21, 22, 26 may be designed in accordance with the automatically acting fluid friction coupling according to FIG. 1 or FIG. 2 or, in a different design, the central differential 21 may be substituted by a coupling 1 such as is illustrated in FIG. 1 or FIG. 2.

Figure 5:
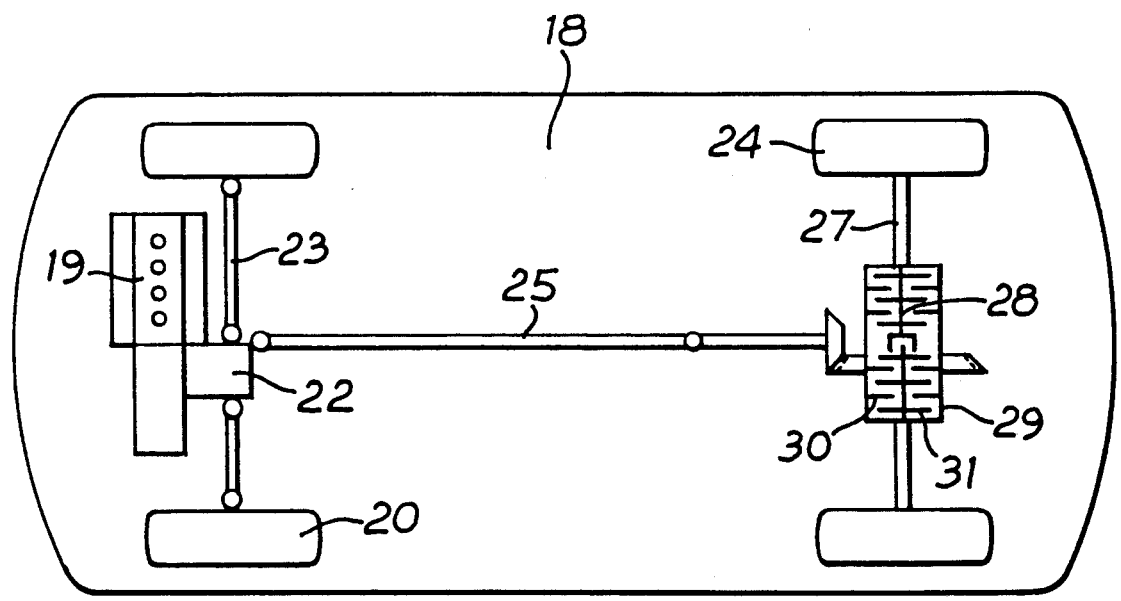
FIG. 5 is a diagrammatic view of a drive concept similar to that of FIG. 4, but with the rear wheels being driven by means of a coupling according to the invention constructed as a torque splitter.

In FIG. 5, the drive concept is applied to a four wheel drive vehicle 18 in the case of which the lockable rear axle differential is substituted by a torque splitter 28 which comprises a rotatingly driven housing 29 with which the outer plates 30, preferably two sets of plates, are associated. There are provided two separate hubs one of which is non-rotatingly connected to the rear side shaft 27 of the left hand rear wheel 24 and the other one to the rear side shaft 27 of the right hand rear wheel 24. Each hub is associated with inner plates 31 in accordance with the invention. The torque splitter 28 combines a differential effect and a locking effect just like a fluid friction coupling.

I claim:

1. A fluid friction coupling having at least two sets of plates, the coupling comprising a first coupling part in the form of a hub and a second coupling part in the form of a housing which is at least partially filled with a viscous fluid, one of the sets of plates being non-rotatably connected to the first coupling part and the other set of plates being non-rotatably connected to the second coupling part, the plates of the two sets of plates being arranged to alternate and to radially overlap one another, wherein plates of one of the sets of plates are provided with slots and segments between the slots are inclined in the same direction relative to the radial plane of the plate at an angle which is substantially the same for each segment of the plate.

2. A fluid friction coupling according to claim 1, wherein the plates with the inclined segments are arranged in an axial sequence with their segments all inclined in the same direction.

3. A fluid friction coupling according to claim 1, wherein the plates with the inclined segments are arranged in an axial sequence in pairs having their segments inclined in opposite directions.

4. A fluid friction coupling according to claim 1, wherein the plates with the inclined segments are arranged in an axial sequence with the segments of some of the plates inclined in one direction and the segments of the remaining plates inclined in the opposite direction.

5. A fluid friction coupling according to claim 4, wherein the plates with their segments inclined in said one direction are arranged in one half of the housing and the plates with their segments inclined in said opposite direction are arranged in the other half of the housing.

6. A fluid friction coupling according to claim 1, wherein the plates with the inclined segments are associated with the coupling hub.

7. A fluid friction coupling according to claim 1, wherein the plates with the inclined segments are associated with the coupling housing.

* * * * *